United States Patent [19]
Ota et al.

[11] Patent Number: 5,430,766
[45] Date of Patent: Jul. 4, 1995

[54] BURST MODE DIGITAL DATA RECEIVER

[75] Inventors: Yusuke Ota, Mountain Lakes; Robert G. Swartz, Tinton Falls, both of N.J.

[73] Assignee: AT&T Corp., Murray Hill, N.J.

[21] Appl. No.: 293,908

[22] Filed: Aug. 22, 1994

Related U.S. Application Data

[63] Continuation of Ser. No. 976,039, Nov. 13, 1992.

[51] Int. Cl.$^6$ .......................................... H04L 25/06
[52] U.S. Cl. .................................. 375/318; 375/345; 330/11; 327/52; 327/58
[58] Field of Search ............ 375/76, 98; 307/268, 307/357, 358, 359; 455/239.1, 240.1; 328/149; 330/11

[56] References Cited

U.S. PATENT DOCUMENTS

| | | | |
|---|---|---|---|
| Re. 33,665 | 8/1991 | Ogawa | 375/106 |
| 4,227,155 | 10/1980 | Lerma | 330/11 |
| 4,363,977 | 12/1982 | Tsuda et al. | 330/11 |
| 4,494,241 | 1/1985 | Mayoux | 375/98 |
| 4,498,001 | 2/1985 | Smoot | 250/214 A |
| 4,714,828 | 12/1987 | Bacou et al. | 330/11 |
| 4,736,391 | 4/1988 | Siegel | 330/11 |
| 4,781,195 | 11/1988 | Martin | 356/41 |
| 4,884,141 | 11/1989 | Hyakutake | 455/239.1 |
| 4,905,255 | 2/1990 | Aalaei | 375/98 |
| 4,926,442 | 5/1990 | Bukowski et al. | 375/76 |
| 4,937,842 | 6/1990 | Howell | 375/76 |
| 5,025,176 | 6/1991 | Takeno | 307/359 |
| 5,025,456 | 6/1991 | Ota et al. | 375/76 |
| 5,050,190 | 9/1991 | Shimada et al. | 375/76 |
| 5,119,404 | 6/1992 | Aihara | 375/76 |

FOREIGN PATENT DOCUMENTS 0102174 3/1984 European Pat. Off. ...... H03G 3/20

OTHER PUBLICATIONS

M. Aiki et al, "446 Mbit/s Integrated Optical Repeater," Journal of Lightwave Technology, vol. 3, No. 2, Apr. 1985, pp. 392–399.

C. A. Brackett et al, "A Noise Immune 32 Mb/s Optical Data Link," Sixth European Conference On Optical Communication, Sep. 1980, pp. 458–461.

"Electronics For High Speed, Burst Mode Optical Communications", by R. G. Swartz and Y. Ota, International Journal of High Speed Electronics, vol. 1, Nos. 3 & 4 (1990) 223–243.

"DC-1 Gb/s Burst-Mode Compatible Receiver for Optical Bus Applications" by Yusuke Ota, et al., Journal of Lightwave Technology, vol. 10, No. 2, Feb. 1992.

"DC-Coupled Burst Mode Optical Receiver Using High Speed ATC Circuit", by T. Nagabori, et al. 1992 Fall Meeting of the Japan Electronic Information Communication Society, Translation provided.

*Primary Examiner*—Stephen Chin
*Assistant Examiner*—Timothy J. May
*Attorney, Agent, or Firm*—John A. Caccuro

[57] ABSTRACT

A dc-coupled packet mode digital data receiver, for use with an optical bus uses peak detectors to adaptively establish an instantaneous logic threshold at the beginning of a data burst. A dc compensator, responsive to outputs of the peak detectors, shunts dc or low frequency currents, corresponding to "dark level" optical signals, from the input of the receiver.

18 Claims, 6 Drawing Sheets

BURST MODE DIGITAL DATA RECEIVER

CROSS-REFERENCE TO RELATED APPLICATION

This application is a continuation of application Ser. No. 07/976,039, filed on Nov. 13, 1992.

Related subject matter is disclosed in the following application filed concurrently herewith and assigned to the same Assignee hereof: U.S. patent application Ser. No. 07/976,037 entitled "Packet Mode Digital Data Receiver", now U.S. Pat. No. 5,371,763.

TECHNICAL FIELD

This invention relates to digital data receivers and more particularly to a receiver for receiving burst mode digital data.

BACKGROUND OF THE INVENTION

A requirement for conventional data transmission is the establishment of well-defined logic thresholds. Metallic wired systems use pre-defined dc logic levels for this purpose. This is unsatisfactory in an optical system where absolute signal levels are not known a priori. The conventional solution is ac-coupling between the receiver and the logic quantizer. With this approach, dc logic threshold levels are established by forming a "signal average" of the received data pulse. Signals above the average are considered as logic ONEs, while signals below the average are logic ZEROs. While ac-coupled receivers work well for continuous data transmission they do not work well for burst mode data transmissions, where the time average of the signal is continuously and unpredictably varying.

By contrast, high-speed, dc-coupled receivers, while ideally suited for burst mode operation, have proven difficult to implement because of the necessity of establishing a logic reference voltage level within a few millivolts of the dc center (one-half of the sum of the minimum and maximum excursions of the data signal) of the received data pulse.

Our prior U.S. Pat. No. 5,025,456 entitled "Burst Mode Digital Data Receiver" and issued Jun. 18, 1991, solved the above problem using a burst mode digital data receiver which adapts to the amplitude of the incoming burst data packet and automatically adjusts the logic threshold voltage to the dc center, ideally during the first bit of the input data burst.

Today, packet data transmissions are now being sent over optical bus communication systems as described in our article entitled "DC-1Gb/s Burst-Mode Compatible Receiver for Optical Bus Applications" by Yusuke Ota, et al., *Journal of Lightwave Technology*, Vol. 10, No. 2, February 1992. In a bus system, the above-described problem is elevated to a higher degree of difficulty, because now the bus medium is time shared by many optical transmitters.

These bus systems impose two new constraints on the prior an receivers. The first is that receivers are likely to receive closely-spaced packet data signals from different transmitters which have widely varying power levels. For example, one packet may arrive with power level of −15 dBm, followed a few bits later by another packet with power level of −35 dBm (one hundred times smaller). The receiver has to be able to handle a wide range of packet amplitudes, separated by only a few nanoseconds in time.

Second, because it is difficult to turn a transmitter's laser optical source "on" and completely "off" very quickly, lasers are typically biased so that they are always slightly on, But when many lasers are mounted on a bus, each of them slightly on all the time, the dc "dark level" light that results can easily be more than some of the weaker ac signals you are trying to detect. So, there is a need for some equivalent of a high-pass filter to get rid of sensitivity to dc light levels. The easiest way to introduce a high-pass filter is simply to ac couple the signal. But that reintroduces all the problems with ac coupling that the burst mode receiver was originally intended to solve.

This invention is directed toward solving the second problem while the above recited related application is directed toward solving the first problem.

SUMMARY OF THE INVENTION

In accordance with the present invention, a digital data receiver detects the minimum and maximum amplitude of a received input signal and determines therefrom a dc or low frequency current to be subtracted from a data input signal which is applied to the input of the data receiver. This current shunting arrangement substantially eliminates the dc or low frequency current generated by the photodiode at the input to the data receiver in response to the previously described troublesome received "dark level" light signal. As a result, the present data receiver has dramatically reduced sensitivity to dc "dark level" light, thereby increasing its sensitivity and accuracy of input data signal detection.

More particularly, one embodiment of the present data receiver includes a dc-coupled differential input amplifier circuit having a first input for receiving the input data signal, a second input for receiving a first reference signal, and an amplifier output. A first peak detector detects the peak amplitude of the amplifier output data signal and generates therefrom the first reference signal. A second peak detector detects a negative (minimum) peak amplitude of the amplifier output data signal and generates therefrom a second reference signal. A dc compensator, in response to the first and second reference signals, shunts to ground a portion of the dc or low frequency current of the data input signal applied to the first input of the amplifier.

DETAILED DESCRIPTION

Figure 1:
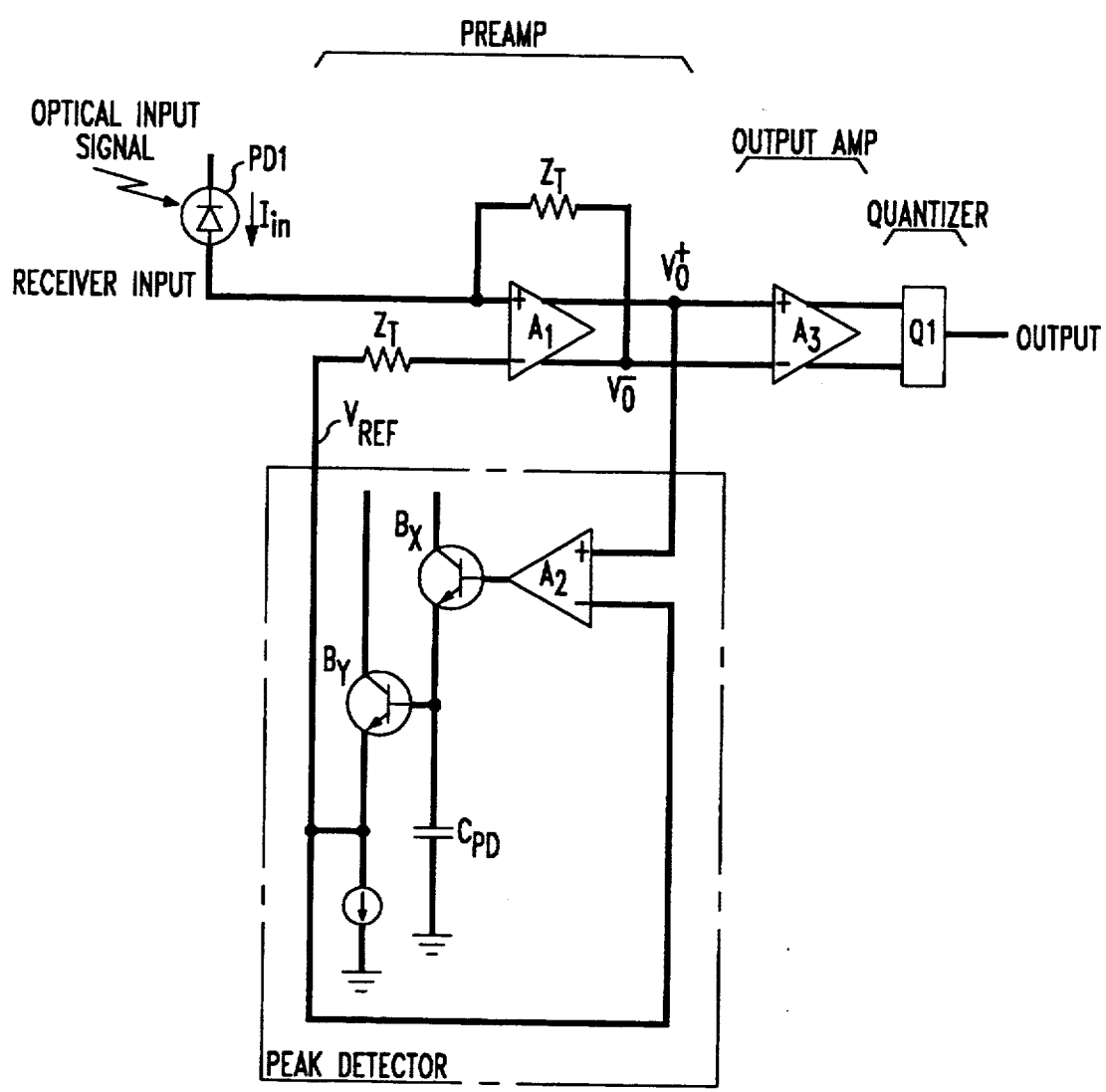
FIG. 1 shows a block diagram of our prior art burst mode receiver circuit of U.S. Pat. No. 5,025,456.
Figure 2:
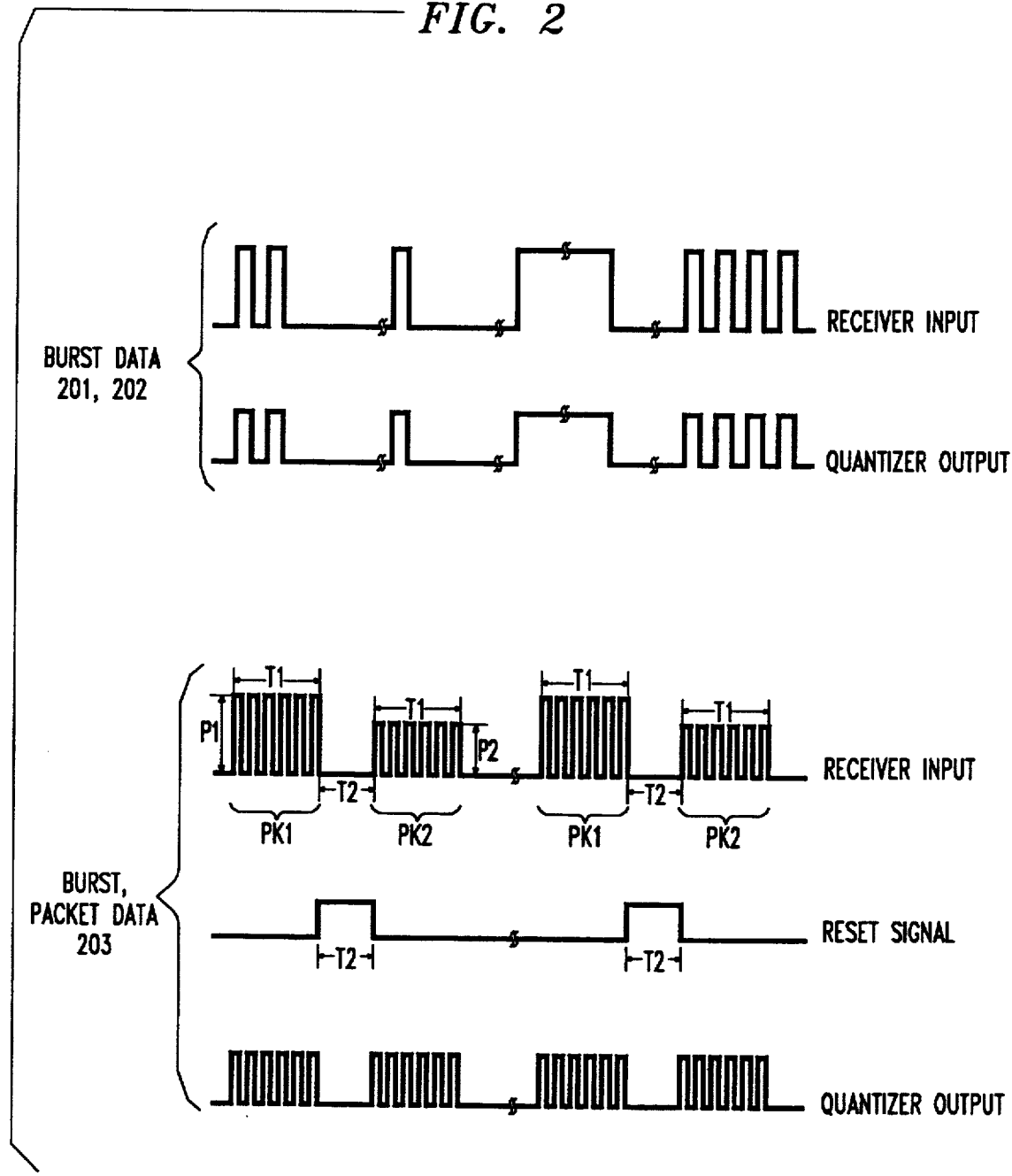
FIG. 2 shows illustrative data wave forms received over an optical communication system operating in one of two modes (1) burst mode, intermittent, single-transmitter source and (2) packet mode, intermittent, multiple transmitter source.

With reference to FIG. 1, we describe the prior art burst mode receiver architecture (disclosed in our U.S. Pat. No. 5,025,456 issued on Jun. 18, 1992, entitled "Burst Mode Digital Data Receiver", and incorporated by reference herein) which establishes an "instantaneous logic threshold", $V_{REF}$, determined at the beginning of each signal burst. This logic threshold level replaces the dc signal average usually established in ac-coupled receivers. The logic threshold $V_{REF}$ is set equal to the half amplitude point of the peak input signal, and subsequent signal amplification is referenced to this level. Threshold determination must be very rapid, and ideally is completed by the conclusion of the first bit in the signal burst. With reference to FIG. 2, a typical burst mode digital data input signal inputted to the burst mode receiver is shown by 20 1 and the quantizer output is shown by 202.

Returning to FIG. 1, the receiver includes four blocks: a differential input/output transimpedance amplifier ($A_1$), a high speed peak detector ($A_2$), an optional gain amplifier ($A_3$), and a quantizer circuit ($Q_1$). The quantizer circuit $Q_1$ converts the analog signal outputted from the receiver to a clean digital ZERO or ONE signal at a voltage level (e.g., ECL) compatible with the circuits to which it connects.

The operation of the receiver is as follows. With no data present, the peak hold capacitor $C_{PD}$ is discharged. When data arrives, photodetector PD1 produces photocurrent $I_{in}$, the differential output voltage of amplifier $A_1$ becomes $V_0^+ - V_0^- = \Delta V_0 = I_{in} Z_T$, where $Z_T$ is the transimpedance (feedback resistor) between the positive input and negative output of $A_1$. One of $A_1$'s differential outputs, and therefore one-half of the net output swing, is sampled by the peak detector and stored on $C_{PD}$. This half-amplitude reference level, $I_{in} Z_T/2$, is applied to the complementary (negative) input of $A_1$, thus establishing the logic threshold $V_{REF}$. The peak detector charges very rapidly, but there may be some pulse width distortion of the output during the first few bits in a burst. Logic level acquisition is accelerated by reducing the size of the peak detector capacitor $C_{PD}$. However, $C_{PD}$ is used also to stabilize the peak detector feedback loop around $A_1$ and $A_2$. If $C_{PD}$ is too small, then peak detector loop instability results.

Figure 3:
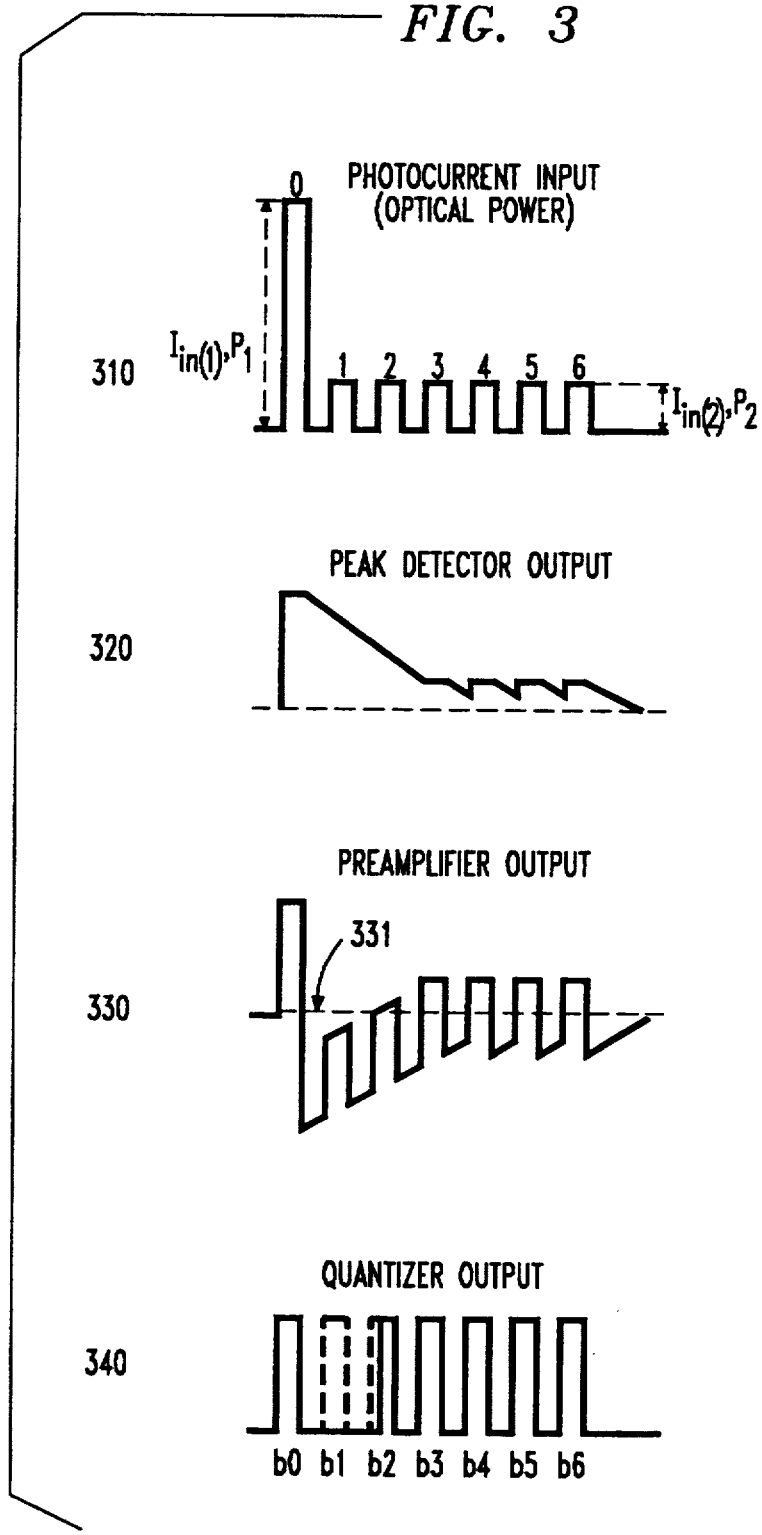
FIG. 3 shows illustrative photo current input, peak detector output, preamplifier output, and decision circuit (quantizer) output for the circuit of FIG. 1 operated in the packet mode.

In an optical bus application of the receiver of FIG. 1, two new problems arise. First, optical packets with widely varying signal amplitudes can appear, closely spaced on the bus. With reference to FIG. 2, this is shown by 203 where the packets PK1 (from a first transmitter) and PK2 (from a second transmitter) may have the same time slot width T1 and where packets PK1 have significantly higher signal amplitudes than the packets PK2. In the circuit of FIG. 1, after a large amplitude packet PK1 threshold has been stored on $C_{PD}$, then the circuit may not distinguish a small amplitude packet PK2 from noise. Therefore, such packets must be separated by a long enough time interval (e.g., T2 shown in 203) to allow $C_{PD}$ to discharge. The problem is illustrated in FIG. 3. As shown in 310 the photocurrents $I_{in(1)}$ and $I_{in(2)}$ are proportional to the received optical signal powers $P_1$ and $P_2$, and $I_{in(1)}$ is much larger than $I_{in(2)}$. In this case, 320, the peak detector output is determined by the first large $I_{in(1)}$ signal (pulse 0), and is too large for the peak of the first following $I_{in(2)}$ pulse (pulse 1) to reach the logic slicing level 331, of the quantizer circuit $Q_1$. Then, as shown by 340, the quantizer circuit $Q_1$ output bit 1 is completely missing, (shown as dotted pattern) and bit 2 suffers a large pulse width distortion (in this example).

Figure 4:
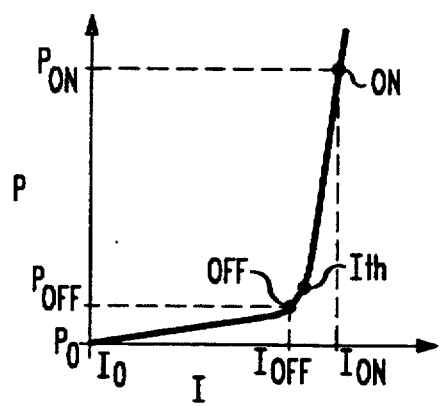
FIG. 4 shows an illustrative curve having laser luminosity (or optical output P) as a function of laser current.

A second problem in optical bus applications is the low frequency "dark level" optical power. With reference to FIG. 4 we illustratively depict the operating levels of a laser diode. It is impractical to modulate a transmitter's laser diode between its "true" OFF (i.e., $P_0$, $I_0$) and its ON (i.e., $P_{on}$, $I_{on}$) states at high speed. Consequently, lasers are typically biased OFF at a current $I_{off}$ (slightly below the lasing threshold current $(I_{th})$) where there is some light output ($P_{OFF}$) even in the OFF state. Extinction ratios ($P_{on}/P_{off}$) of 10–20 are typical. Therefore, with many lasers on a bus, the dark (all off) light level could be $NP_{off}$, where N is the number of lasers. This light-level approaches the ON-state light-level of an individual laser. Moreover, because of the 100:1 permissible variation in received optical power from packet to packet, it is possible that the optical power of the dark level signal could exceed the burst signal level of some packets by a significant factor.

Figure 5:
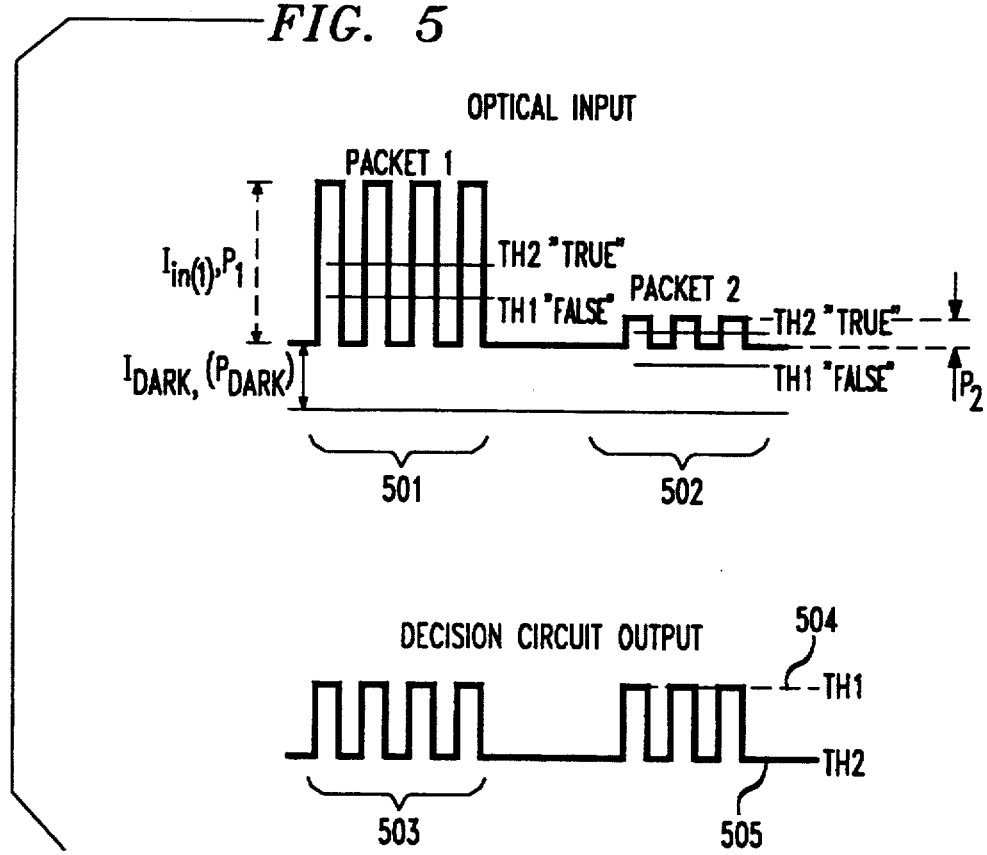
FIG. 5 shows the photo current (optical) input and decision circuit receiver output for the circuit of FIG. 1 in the case when the "dark current" (essentially a dc current) is non-zero. "TH2" represents the "true" or ideal logic thresholds at the center of the ac signal swing; "TH 1" is the false logic threshold established at half the total input amplitude, including the dark current.

In the present dc-coupled packet data receiver architecture, logic threshold is $I_{in} Z_T/2$, where $I_{in}$ is the input signal corresponding to the maximum optical signal input $P_{in}$. With reference to FIG. 5, in the presence of dark level current, a "false" logic threshold TH1 equal to $(I_{dark} + I_{in}) Z_T/2$ is established rather than the "true" logic threshold TH2 equal to $I_{in} Z_T/2$. When $I_{dark} < I_{in}$, as shown by 501, proper input signal detection is still probable, as shown by 503. However, when $I_{dark} \geq I_{in}$, then, as shown by 502, the false threshold TH1 would cause the input signal to be improperly detected, as shown by 504, rather than being properly detected, as shown by 505.

Figure 6:
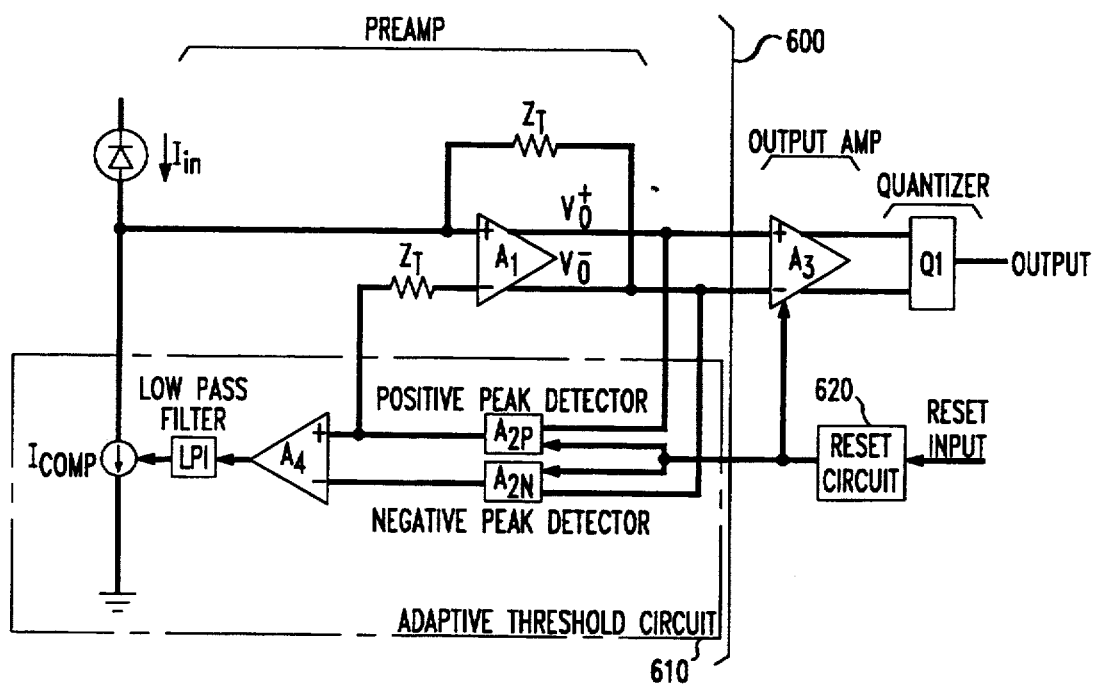
FIG. 6 is a block diagram of a "Packet Data Receiver" in accordance with the present invention which includes an Adaptive Threshold Circuit modified to handle "dark level" input currents, and a Reset circuit which enables the reception of closely-spaced data packets of differing power levels.

A simplified functional diagram of our new circuit is shown in FIG. 6. The preamp, corresponding to $A_1$ in FIG. 1, is a differential input/output transimpedance amplifier. The Adaptive Threshold Circuit 610 is a modified, enhanced version of the peak detector ($A_2$, $B_X$, $B_Y$, $C_{PD}$) in FIG. 1. The Output Amplifier corresponds to $A_3$, and the Packet Threshold Reset Circuitry (hereinafter Reset circuit) 620 is a new function, added to allow zeroing of the peak detector capacitor between data packets. The new capabilities are described in the following sections. The Reset function is introduced to each peak detector circuit and allows rapid and precise zeroing of the peak detector capacitor. By activating the Reset circuit 620 at the conclusion of a data packet (T2 of FIG. 2), the receiver is prepared to establish a new logic threshold (e.g., at a substantially reduced level) after a short reset interval. The dark level light problem is handled by a "dark level compensator" (Darcom) circuit (includes preamp A1 and Adaptive Threshold Circuit 610) which measures and shunts or subtracts out the low frequency input signal ($I_{comp}$) portion of $I_{in}$. Moreover, the peak detector circuits ($A_{2P}$, $A_{2N}$), as described later, are modified to increase stability and improve the accuracy of peak detector tracking.

Dark Level Compensator (Darcom) Circuit

A block diagram of the dark level compensator (Darcom) circuit 600 is shown in FIG. 6. Darcom circuit 600 consists of the input amplifier $A_1$, a positive peak detector $A_{2P}$, a negative peak detector $A_{2N}$, a comparison amplifier, $A_4$, and a low pass filter LP1. Detector $A_{2P}$ samples the peak value of the positive output of amplifier $A_1$. Detector $A_{2N}$ samples the peak value of the negative output of amplifier $A_1$. Because of the differential outputs, ($V_0^+$ and $V_0^-$) of amplifier $A_1$, the positive and negative peak detectors, $A_{2P}$ and $A_{2N}$, can be implemented as identical circuits, thus assuring matching of tracking accuracy, and improving overall precision. Detector $A_{2P}$, is used with amplifier $A_1$ to set a logic threshold equal to half the maximum input swing (e.g., TH2 of FIG. 5).

Figure 7:
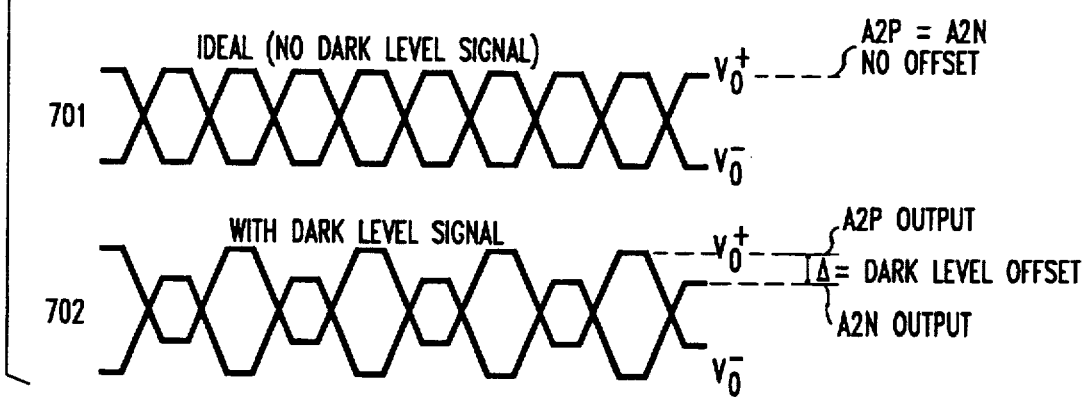
FIG. 7 shows representative output signal levels for preamp $A_1$ and the corresponding levels for peak detectors $A_{2P}$ and $A_{2N}$ in the cases where dark level signal is and is not present.

The Darcom circuit 600 relies on the spectral characteristics of the peak detector circuits ($A_{2P}$, $A_{2N}$). In the higher frequency range, bounded on the lower end by the discharge time of the peak detector capacitors, the peak detectors ($A_{2P}$, $A_{2N}$) act as peak sampling circuits with unity gain. At low frequencies, however, the peak detector capacitors have enough time to discharge, and consequently $A_{2P}$, and $A_{2N}$ are simply unity gain amplifiers. While the outputs of $A_{2P}$, and $A_{2N}$ do track low frequency variations in the input current $I_{in}$, the following, for simplicity, refers to these low frequency variations as the "dc" $I_{dark}$ current. Thus, $A_{2P}$ and $A_{2N}$ apply the peak values of the positive and negative outputs ($V_0^+$ and $V_0^-$) of amplifier $A_1$ as inputs to comparison amplifier $A_4$. As shown in FIG. 7, these peak detector outputs ($V_0^+$ and $V_0^-$) consist of the sum of a high frequency common signal peak and a low frequency difference signal (dark level offset). Thus, in the absence of a dark level offset signal the peak detector $A_{2P}$, $A_{2N}$ outputs appear, as shown by the dotted voltage level in 701, while waveforms 702 depict the outputs in the presence of a dark level offset signal $\Delta = A_{2P} - A_{2N}$. In turn, $A_4$ together with low pass filter LP1 converts this into a "dc difference" signal, ($I_{comp}$) which is subtracted from the input signal $I_{in}$. Thus, a dc (or low frequency) feedback loop is established in Darcom circuit 600 that forces the dc (or low frequency) signals' differential output of $A_1$ to zero, cancelling out the input dark current ($I_{dark}$) along with any other dc offset signals (or low frequency offset signals). Such other dc offset signals may be derived from the outputs $V_0^+$ and $V_0^-$ of amplifier A1 or from peak detectors $A_{2P}$ or $A_{2N}$. Low pass filter LP1 serves to stabilize the Darcom feedback loop, and also to average out fluctuations in the dark level signal.

If the logic threshold has been properly established by the positive peak detector $A_{2P}$ as $I_{in}Z_T/2$, (as shown by TH2 of FIG. 4) then the differential outputs of $A_1$ swing symmetrically above and below the logic threshold. Accordingly, the magnitude of the positive and negative peaks will be equal. Therefore, the outputs of $A_{2P}$ and $A_{2N}$ will also be equal, thus the differential voltage into amplifier $A_4$ is zero and hence inducing no net change in $I_{comp}$ at the output of comparison amplifier $A_4$. This is illustrated as the "ideal" case 701 in FIG. 7.

In effect, Darcom circuit 600 ignores high frequency inputs, while forcing the dc (or low frequency) output component to zero. Proper operation of Darcom circuit 600 depends on accurate tracking and matching of the two peak detectors $A_{2P}$ and $A_{2N}$. If the positive peak detector $A_{2P}$ is inaccurate, then an improper logic threshold may be established, and the peak detector outputs will not be symmetric. This is illustrated by the wave forms 702 in FIG. 7. This may manifest itself as an offset in the differential PreAmp A1 output voltage($V_0^+ - V_0^-$). Likewise, if the peak detectors $A_{2P}$ and $A_{2N}$ do not precisely match each other, then the mismatch will again appear as a PreAmp $A_1$ output offset. Such differential offset voltages would tend to reduce amplifier sensitivity or even to generate false digital logic ZERO or ONE signals. Note also that even if the peak detectors $A_{2P}$ and $A_{2N}$ are accurate and precisely matched, the present scheme introduces constraints on the data format. In particular, the input data sequence must include enough ONEs and ZEROs to properly charge and maintain charge on the two peak detectors. Such restrictions are most relaxed when the peak detectors charge very rapidly and hold the charge for as long as possible.

With the scheme described here, there is in principle no limit on the allowed size of the dark current $I_{dark}$ except for noise considerations. Moreover, even though the Darcom circuit 600 subtracts the low frequency pan of the input spectrum from the main signal path, the information there is still available for other purposes (e.g. monitoring) at the $A_4$ output.

Peak Detectors $A_{2P}$ and $A_{2N}$

Two modifications were made to the prior art peak detector circuitry shown in FIG. 1 to improve tracking and feedback loop stability. In the following discussion since peak detectors $A_{2P}$ and $A_{2N}$ employ similar circuitry and operate in a similar manner, we describe only the operation of positive peak detector $A_{2P}$. The following paragraphs make joint reference to FIGS. 1 and 8. Note the dotted line blocks 860 and 870, as will be described in a later paragraph, illustrate an alternate embodiment for receiving input voltage signals.

Figure 8:
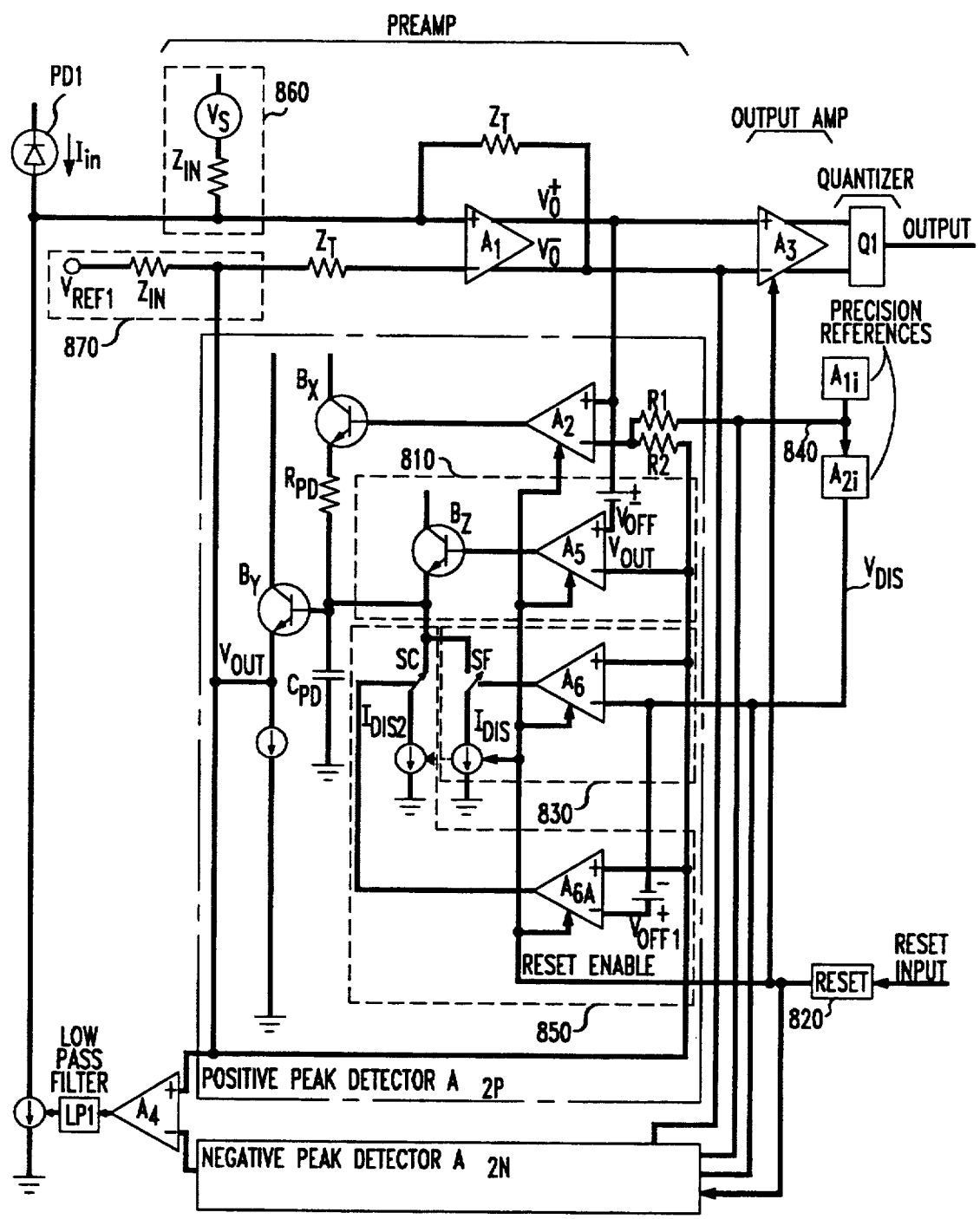
FIG. 8 is a more detailed block diagram of the present invention illustrating the details of the two identical peak detectors each having a Boosted Slew Circuit and the Reset circuit including a peak detector discharge circuit and precision references.

To improve tracking accuracy, the gain of peak detector circuit $A_{2P}$ was increased slightly. For the peak detector circuit shown in FIG. 1, the fractional tracking error($V_{in} - V_0$)/$V_{in}$ is $1/(1+A)$, where A is the open loop gain of the amplifier $A_2$, and $V_{in}$ and $V_0$ are the input and output signals of the peak detector consisting of $A_2$, $B_X$, $B_Y$, and $C_{PD}$. The error is reduced with increasing gain A, but it never goes to zero. A way to minimize the error is to introduce a small amount of gain into the peak detector as shown in FIG. 8. It is easy to show that for $A = 1 + R1/R2$, the fractional tracking error is eliminated.

A second modification was incorporated to improve the stability of the peak detector feedback loop. Referring again to HG. 1, this loop is identified as the path leading from the positive output of $A_1$ through the peak detector and then back to the negative input of $A_1$. Stability requires that there be a single dominant pole in this feedback loop. This is normally designed to be set by the peak detector capacitor $C_{PD}$ in series with the emitter drive resistance of transistor $B_X$. Unhappily, there are many other poles in this loop, including the amplifier poles of $A_1$ and $A_2$, as well as the input poles of $A_1$. Moreover, the driving resistance of $B_X$ is very small, and consequently a large capacitor $C_{PD}$ is needed to establish a dominant pole. Stability of this loop can become marginal.

We improve stability by increasing either $C_{PD}$ or the emitter drive resistance of $B_X$. Unfortunately, if either is increased, then the peak detector charging time is increased and circuit operation is impaired. So, it seems that we are left with a choice between feedback loop instability or slow peak detector charging. According to another aspect of the invention we recognize that the peak detector $A_{2P}$ operates in one of two modes: (1) charging or (2) maintenance. In the charging mode, the positive input to amplifier $A_2$ is greater than the negative input, and the circuit responds by pumping charge into the peak detector capacitor $C_{PD}$. In the charging mode, the circuit is "slew limited". Equivalently, the loop gain is zero, and thus stability is not at issue. In the maintenance mode, the positive and negative inputs to amplifier $A_2$ are approximately equal, and the charge pump $B_X$ on average provides just enough current to balance the discharge current (base current of $B_Y$). In this mode, stability is an issue, and must be assured.

According to another aspect of the present invention, stability is improved by putting a large series resistance $R_{PD}$ in series with the charging transistor $B_X$, as shown in FIG. 8. This lowers the frequency of the dominant pole, now determined approximately by $R_{PD}$ and $C_{PD}$. The impaired charging characteristic that results is remedied by introducing a "slew booster" circuit 810, shown as amplifier $A_5$ and charging transistor $B_Z$ in FIG. 8. The slew booster circuit 810 charges $C_{PD}$ directly, without a limiting series resistor. However, the input to amplifier $A_5$ is offset slightly ($V_{OFF}$) with respect to the input of $A_2$. Consequently, the slew booster turns on only when the difference between the input $V_0^+$ and the stored output $V_{OUT}$ is large, i.e. $>V_{OFF}$. When the voltage stored on $C_{PD}$ charges to within $V_{OFF}$ of the final value, the slew booster circuit 810 turns off, and the main peak detector amplifier $A_2$ charges $C_{PD}$ the rest of the way to equilibrium. Thus, the slew booster circuit 810 is "on" only when the circuit is in the charging mode. When the circuit is in the maintenance mode, the slew booster circuit 810 is off, and therefore does not affect overall feedback loop stability.

Reset Circuit

With reference to 203 of FIG. 2, the Reset circuit, in response to an end-of-packet Reset signal, is designed to discharge both the positive and negative peak detector circuits $A_{2P}$ and $A_{2N}$ very rapidly so that data packets (PK1, PK2) differing in amplitude by approximately 100:1 (P1/P2) can be separated by a time interval (T2), illustratively, as short as four bit periods (this would be approximately 130 ns for a 30 Mb data signal). This interval T2, shown in 203 of FIG. 2, is defined as the "Reset interval." With reference to FIG. 8, the Reset circuit includes a common Reset Enable Circuit 820 which generates a Reset enable signal from a reset signal and a Reset Discharge circuit 830 which is part of each peak detector circuit (830 is shown only for positive peak detector $A_{2P}$)

The Reset circuit provides the following attributes: speed, precision, "clamp" function, power conservation and CMOS/TTL input levels.

The first attribute, speed, is obtained by discharging or clamping the peak detector capacitor $C_{PD}$ as rapidly as possible. This requires, simply, a large discharge current ($I_{DIS}$). The second necessary attribute, precision, complicates the problem by requiring that the discharge current $I_{DIS}$ (clamping function) be turned-off immediately when the peak detector capacitor $C_{PD}$ voltage has reached its starting (no data present) value. That starting value is not zero volts, because of the initial bias voltages within the peak detector circuit $A_{2P}$. The clamp function is necessary to turn the peak detector charging circuitry (i.e., amplifiers $A_2$ and $A_5$) off during the Reset interval, and likewise to turn-off the discharge circuitry (i.e., amplifier $A_6$) during all but the Reset period. The clamp circuit also is used to force the packet receiver output (i.e., amplifiers $A_3$) to a well-defined logic state during the Reset interval. Obviously, if amplifier $A_3$ is part of quantizer circuit $Q_1$, then quantizer $Q_1$ would be reset by the clamp function. Power conservation and CMOSfFFL input levels are system requirements.

The Reset Discharge circuit 830 operates as follows. Comparator amplifier $A_6$ compares the voltage across $C_{PD}$ with a precision reference voltage, $V_{DIS}$. If it exceeds the reference voltage, $V_{DIS}$ then switch $S_F$ is closed and the discharge current $I_{DIS}$ is drawn from $C_{PD}$. The precision reference $V_{DIS}$ is implemented as a two stage image circuit. The voltage $V_{DIS}$ essentially represents the initial output voltage $V_{OUT}$ when no input data is being received by the receiver of FIG. 8. The first stage, $A_{1i}$, is a copy of input amplifier $A_1$, while the second stage, $A_{2i}$, is a copy of peak detector circuit $A_2$. (Note: The gain enhancing resistor, R1, used within the peak detector amplifier $A_2$, is referenced to the output 840 of the first image stage, $A_{1i}$). The voltage $V_{OUT}$ connects directly to a negative input of amplifiers $A_5$, $A_6$, and $A_{6A}$ and connects via resistor R2 to a negative input of amplifier $A_2$. Because $I_{DIS}$ is very large, in order to discharge capacitor $C_{PD}$ rapidly, the time delay through the amplifier $A_6$ discharge loop must be short, or the capacitor $C_{PD}$ will be discharged too far. Likewise, the gain of amplifier $A_6$ must be large to assure a precision discharge. Fortunately, stability is not a concern for the amplifier $A_6$ loop because it can only discharge the capacitor, $C_{PD}$ not charge it; i.e. there is no restoring force to cause oscillation.

The clamping function is effected by the Reset block 820 in FIG. 8. This circuit block translates the Reset input signal into the Reset enable clamping signals, and also turns on and off the discharge current, $I_{DIS}$. This conserves power by minimizing power consumption of the Reset Discharge Circuit 830 at times when the Reset input signal is not present.

In an alternate embodiment a Reset discharge circuit may include a coarse discharge circuit 850 and a fine discharge circuit 830. (Note, using Reset discharge circuit 830 for the fine discharge circuit requires adjusting the discharge current source $I_{DIS}$ to a smaller current value). The coarse discharge circuit 850 operates like the previous described discharge circuit 830 except that it is not activated unless the difference between voltage $V_{OUT}$ and $V_{DIS}$ exceeds the offset voltage $V_{OFF1}$. When activated, coarse discharge circuit 850 enables switch $S_C$ to connect current source $I_{DIS2}$ to discharge capacitor $C_{PD}$. Note, that the fine discharge circuit 830 is also activated since $V_{OUT}$ is greater than $V_{DIS}$. Hence, when $V_{OUT}$ is greater than $V_{DIS}+V_{OFF1}$ both the coarse discharge circuit 850 and fine discharge circuit 830 are discharging capacitor $C_{PD}$ at the same time. Since $I_{DIS2}$ is much greater than $I_{DIS}$, it essentially controls the discharge rate.

Once the voltage $V_{OUT}$ decreases and reaches the value $V_{DIS}+V_{OFF1}$, the coarse discharge circuit 850 switches off the current source $I_{DIS2}$ from capacitor $C_{PD}$. Thereafter, only fine discharge circuit 830 is discharging capacitor $C_{PD}$, ensuring a slower more accurately controllable discharge rate. Using the combined coarse and fine discharge circuits enables the Reset discharge circuit to 1) quickly discharge capacitor $C_{PD}$ of the peak voltage from a high power level packet data and 2) be able to very accurately discharge capacitor $C_{PD}$ down to the desired voltage $V_{DIS}$. For low power packet data, the coarse discharge circuit 850 may not be utilized at all. The end result is that the Reset discharge circuit enables the discharge rate to be increased (ensuring fast discharge) without sacrificing the accuracy of controlling the final discharge voltage. This arrangement allows the Reset circuit to discharge $C_{PD}$ rapidly and precisely without overshooting due to too great a discharge rate. The fast discharge rate ensures that the receiver can reset within a few bit times for a data rate which may vary from the tens to hundreds of megabits/s. The accuracy of setting the final discharge voltage of capacitor $C_{PD}$ ensures that the receiver's dynamic input signal range for adjacent packet data power levels can be about 100 to 1. That is, the receiver can detect a low level packet data signal which immediately follows a high level packet data signal which is 100 times as large as the low level signal.

While the disclosed implementation of our digital data receiver utilizes a transimpedance preamp $A_1$ having a differential output, it should be understood that an amplifier having a single ended output could also be used. In such an embodiment, the output amplifier $A_3$ would then have a single input. Moreover, in such an embodiment, negative peak detector $A_{2N}$ would become a "minimum level" detector utilizing PNP type transistors in place of the NPN type transistors utilized for $B_X$, $B_Y$ and $B_Z$. Thus, detector $A_{2N}$ would then form a minimum level voltage representing the minimum signal (rather than the maximum voltage representation of the negative peak voltage which is produced in the disclosed embodiment). In this case, the dark level offset is determined by the difference between the output of $A_{2N}$ and a new reference voltage which is analogous to the output of image circuit $A_{1i}$, i.e., the amplifier $A_1$ output with no dark level signal present. The comparison amplifier $A_4$ would then remain a difference amplifier that would take the difference between the minimum peak voltages outputted from detector $A_{2N}$ and this new reference. The difference amplifier together with a low pass filter would then produce the dc current $I_{comp}$ which is subtracted or shunted from $I_{in}$ prior to input to amplifier $A_1$.

Additionally, the present invention could be used with voltage input signals (rather than current input signals) by changing amplifier $A_1$ from a transimpedance amplifier to a voltage amplifier. This is accomplished by replacing photodetector $P_{D1}$ with a voltage signal source $V_S$ of specified output impedance. Such an arrangement would replace photodetector $P_{D1}$ with the circuitry shown in the dotted blocks 860 and 870, where the voltage source $V_{REF1}$ is adc bias voltage and the voltage source $V_S$ is the input voltage signal. The resistors $Z_{IN}$ in 860 and 870 convert amplifier $A_1$ from a transimpedance amplifier to a voltage amplifier.

In the disclosed embodiment, the analog circuit blocks are actually either well-known ECL gates, or simple modifications of ECL gates. The ECL gate consists of a differential pair with current source load, followed by an emitter follower stage. These circuits, while offering limited gain, are inherently very fast. The input amplifier, output amplifier, peak detectors $A_{2P}$ and $A_{2N}$, amplifiers $A_5$ and $A_6$, and precision references $A_{1i}$ and $A_{2i}$ may be implemented using circuits which are described in more detail in our previously referenced article.

While the disclosed embodiment of the present invention is implemented using bipolar integrated circuit technology, it should be noted that other circuit technologies could be utilized, including FET.

The circuit can be implemented using, for example, silicon, gallium arsenide or other appropriate semiconductor materials. Moreover, it is contemplated that other well-known circuits can be used to implement the amplifier circuit functions shown in FIG. 8 without departing from the teaching of the present invention.

Additionally, while the present invention was described as a receiver for use in a burst mode operated packet data system, it could be utilized in a system that utilizes continuous data transmissions. Although the present invention has been described for use with optical signals, it should be understood that the present invention can be utilized in non-optical signals as well.

Thus, what has been described is merely illustrative of the application of the principles of the present invention. Other methods and circuits can be implemented by those skilled in the art without departing from the spirit and scope of the present invention.

We claim:

1. A digital data receiver comprising
    a dc-coupled differential input amplifier circuit having first input means for receiving a digital data input signal, second input means for receiving a first reference signal, and differential output means for outputting a positive and a negative data output signals;
    first detector means for detecting a first polarity peak amplitude of said positive data output signal and for generating said first reference signal;
    second detector means for detecting a second polarity peak amplitude of said negative data output signal and for generating a second reference signal, said first and second polarities being the same; and
    proportional means, responsive to a difference of said first and second reference signals, for continuously subtracting a proportional amount of a low frequency current of said data input signal from said first input means.

2. The receiver of claim 1 wherein said first detector means includes
    means for storing said first polarity peak amplitude of said data output signal and
    amplifier means for controlling a discharge rate of said means for storing.

3. The receiver of claim 2 wherein said detector means includes a slew booster amplifier for a charging of said storing means, said slew booster amplifier including a comparator means for enabling said slew booster amplifier when said data output signal exceeds said first reference signal by more than a predetermined offset voltage.

4. The receiver of claim 3 wherein said first detector means includes detector output means having a resistor connected to said storing means and wherein a time constant formed by a product of said resistor value and said storing means value is a dominant pole in a feedback path between said output means and said second input means of said input amplifier circuit.

5. The receiver of claim I wherein said second detector means includes
means for storing said second polarity peak amplitude of said data output signal and
amplifier means for controlling the discharge rate of said means for storing.

6. The receiver of claim 1 wherein said first and second detector means are each implemented using circuit apparatus having identical operating characteristics.

7. The receiver of claim 1 wherein said first and second detectors are part of an integrated circuit.

8. The receiver of claim 1 wherein said proportional means includes
comparison amplifier means having a first input connected to said first reference signal, a second input connected to said second reference signal, and an output means for controlling the continuous subtracting of a proportional amount of said low frequency current from said data input signal.

9. The receiver of claim 1 wherein said input amplifier circuit has a first feedback loop to regulate a magnitude of an input current to voltage output transfer characteristic of said input amplifier circuit.

10. The receiver of claim 1 wherein said digital data input signal is a current signal and wherein said input amplifier circuit is a transimpedance amplifier circuit.

11. The receiver of claim 1 wherein said digital data input signal is a voltage signal and wherein said input amplifier circuit is a voltage amplifier circuit.

12. The receiver of claim 1 wherein said first reference signal is a dc voltage approximately equal to one-half of a peak-to-peak amplitude of said positive data output signal.

13. The receiver of claim 1 wherein
said first detector means includes a differential input amplifier having a positive input means connected to said positive data output signal and having a negative input means connected to said first reference signal, and
said second detector means includes a differential input amplifier having a positive input means connected to said negative data output signal and having a negative input means connected to said second reference signal.

14. The receiver of claim 1 further including
converter means for converting a received optical input signal into said data input signal.

15. A digital data receiver comprising
a dc-coupled differential amplifier circuit having first input means for receiving a digital data input signal, second input means for receiving a reference signal, and differential output means for outputting a first and second polarity data output signals;
first detector means for detecting a peak amplitude of said first polarity data output signal and for generating said reference signal; and
second detector means for detecting a difference between a first and second peak amplitudes of said first and second polarity data output signals, respectively, said first and second peak amplitudes being of the same polarity, and in response thereto continuously subtracting a proportional amount of a low frequency current from said data input signal at said first input means.

16. A digital data receiver comprising
a dc-coupled differential amplifier circuit having first input means for receiving a digital data input signal, second input means for receiving a reference signal, first output means for outputting a first data output signal and a second output means for outputting a second data output signal;
first detector means for detecting a first polarity peak amplitude of said first data output signal and for generating said reference signal;
second detector means for detecting a second polarity peak amplitude of said second data output signal, said first and second polarity being the same; and
means, responsive to a difference signal from said first and second detector means, for continuously subtracting a portion of said data input signal from said first input means.

17. A digital data receiver comprising
a dc-coupled amplifier circuit having first input means for receiving a digital data input signal, having a dc current component, second input means for receiving a first reference signal, and in response thereto generating a positive and negative data output signals;
first detector means for detecting a first peak amplitude of said first data output signal and for generating said first reference signal; and
second detector means for detecting a difference between a first polarity peak amplitude of said positive data output signal and said first polarity peak amplitude of said negative data output signal and for generating a second dc current which is continuously subtracted from said dc current component of said data input signal.

18. An optical signal receiver comprising
means for receiving a digital optical signal,
means for converting the received digital optical signal into an electronic data signal,
a dc-coupled differential input amplifier circuit having first input means for receiving said electronic data signal, second input means for receiving a first reference signal, and differential output means for outputting first and second data output signals;
first detector means for detecting a first peak amplitude of said first data output signal and for generating said first reference signal; and
second detector means for detecting a difference between a first polarity peak amplitude of said first data output signal and said first polarity peak amplitude of said second data output signal and in response thereto continuously subtracting a proportional amount of a low frequency current from said data input signal at said first input means.

* * * * *